Figures 1, 2, 3:
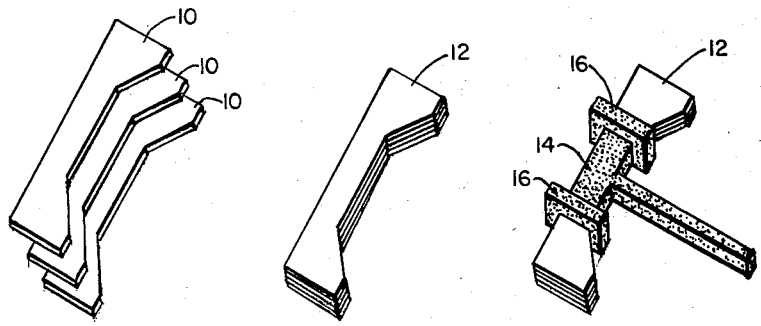

Jan. 14, 1964 J. P. WOODS ETAL 3,117,349
PRESSURE INJECTION MOLD
Original Filed Feb. 6, 1956 4 Sheets-Sheet 1

ATTEST
Charles T. Steininger

INVENTORS.
John P. Woods.
BY Henry R. Barta.
ATTORNEY

Jan. 14, 1964    J. P. WOODS ETAL    3,117,349
PRESSURE INJECTION MOLD

Original Filed Feb. 6, 1956    4 Sheets-Sheet 2

ATTEST
Charles F. Steininger

INVENTORS.
John P. Woods.
BY Henry R. Barta.
ATTORNEY

Jan. 14, 1964     J. P. WOODS ETAL     3,117,349
PRESSURE INJECTION MOLD

Original Filed Feb. 6, 1956     4 Sheets-Sheet 3

ATTEST
Charles F. Steininger

INVENTORS.
John P. Woods.
BY Henry R. Barta.
ATTORNEY

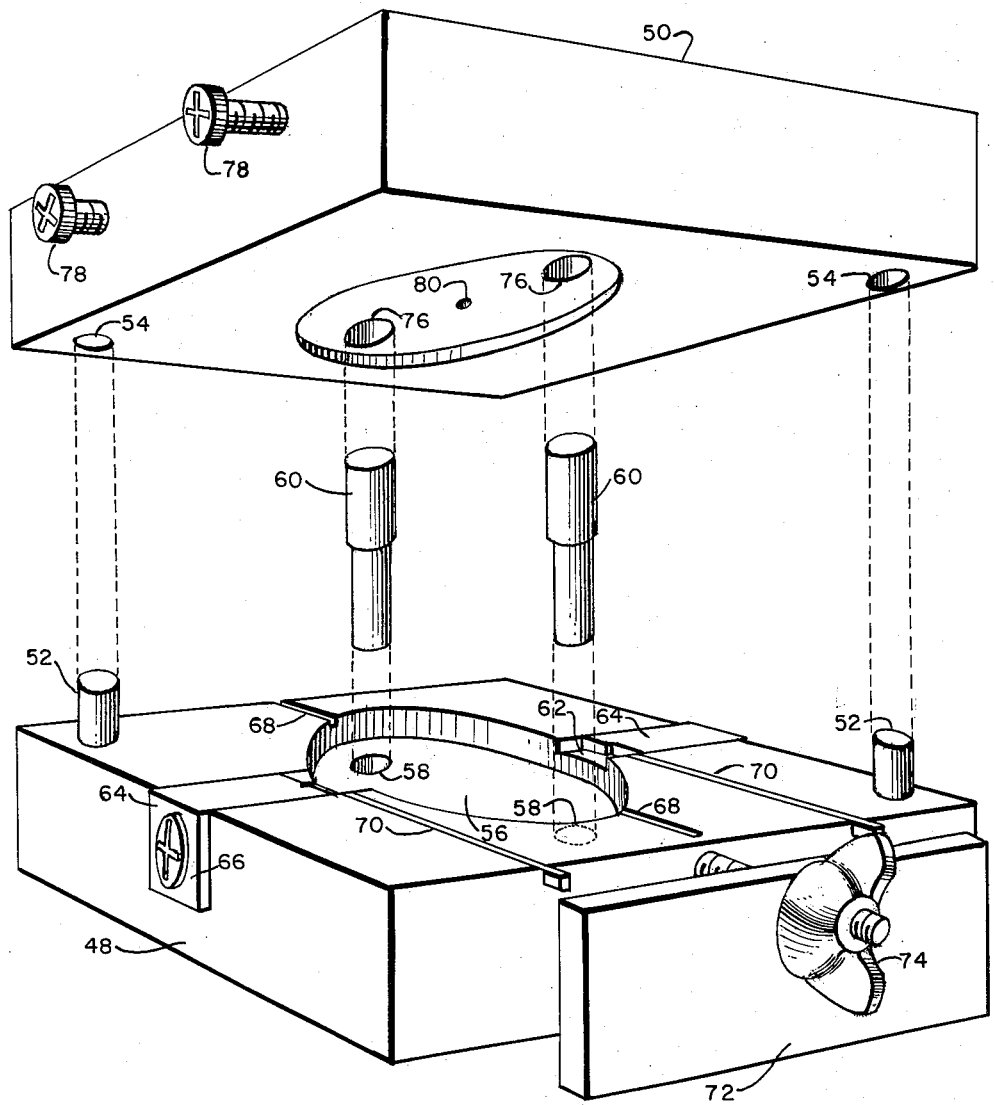

United States Patent Office 3,117,349
Patented Jan. 14, 1964

3,117,349
PRESSURE INJECTION MOLD
John P. Woods and Henry R. Barta, Dallas, Tex., assignors to The Atlantic Refining Company, Philadelphia, Pa., a corporation of Pennsylvania
Original application Feb. 6, 1956, Ser. No. 563,463, now Patent No. 3,080,642, dated Mar. 5, 1963. Divided and this application June 30, 1960, Ser. No. 40,054
3 Claims. (Cl. 18—36)

The present invention relates to a novel pressure injection mold. In another aspect the present invention relates to a novel pressure injection mold adapted to form a thin unitary body around a single magnetic recording and/or reproducing head. More specifically, this application relates to a novel pressure injection mold for practicing the method of manufacturing described in my co-pending application, Serial No. 563,463, filed February 6, 1956, now Patent No. 3,080,642 of which the present application is a division.

Present day uses of electromagnetic recording and reproducing apparatus, such as, recently developed memory devices and seismic exploration equipment, make it highly desirable to produce magnetic recording heads which are economical, small in size, sufficiently rugged to withstand physical shocks, and readily replaceable in the event of failure. Since the total amount of information to be recorded and retained in the use of such equipment is very large, it is imperative that a large number of individual recording heads be employed simultaneously and that a maximum amount of information be accommodated within a minimum of recording surface. Therefore, a major problem to the equipment manufacturer or user is the production of multi-channel or multiple head recording assemblies which will meet the previously mentioned requirements.

In present day methods of manufacturing magnetic recording heads, the first step of the operation is to provide suitable pole pieces wound with a predetermined number of turns of an electrically conductive wire. Each pole piece is generally formed by cementing together thin sheets of transformer steel, hydrogen annealed molybdenum permalloy, or the like to form a laminated pole piece. In order to insulate the pole piece from the electrical winding it is then necessary to provide a suitable non-conductive winding base on the pole piece. Since the pole pieces employed in the formation of magnetic recording heads are generally C-shaped in structure even this simple operation of forming a winding base is unduly complicated and wrought with difficulties. In some cases the winding bases are formed by wrapping insulating tape about the mid portion of the pole piece. However, this type of winding base obviously has no means of holding the winding on the insulated portion and therefore extreme care must be exercised in the winding operation to prevent running off the insulation and once the pole piece is wound the winding must be covered with a heavy coating of a binding cement to prevent the winding from being displaced and contacting the uninsulated portion of the pole piece. In some few other cases a preformed winding base of a nonconductive resin, generally provided with flanges at either end to hold the winding within the limits of the base, is provided. Inasmuch as the pole pieces are C-shaped, this preformed base must be made in two sections which are then cemented together about the mid portion of the pole piece. Obviously, this method of providing a winding base requires an undue multiplicity of operations which form a major portion of the cost of manufacture of the head.

Once the electrical windings have been placed on the individual pole pieces two such pole pieces are then assembled in face-to-face relationship to each other with a predetermined gap between the confronting tips of the pole pieces to form a complete recording head. This step in the manufacture of the recording head is generally performed by placing a thin, nonmagnetic spacer between the confronting tips of the pole pieces and clamping the pole pieces between two preformed blocks of nonconductive material, as by placing the blocks of nonconductive material on the top and bottom of the pole pieces and running a bolt vertically through the entire assembly. It is obvious that the problems of aligning the two pole pieces and accurately adjusting the gap are quite troublesome in this type of construction. In addition, recording heads constructed in this manner are not sufficiently rugged for certain uses and the heads are too bulky for use in apparatus requiring a large number of heads.

More recently it has been proposed that a compact multiple head construction may be made by forming two separate, symmetrical half sections, each half representing the mirror image of its companion half. Each such half head contains the required number of individual wound pole pieces spaced a predetermined distance from one another. The individual pole pieces are cast in a thermo-setting resin to form the half sections mentioned above. The exposed tips of the two half sections are then machined so that the pole tips lie in a common plane. The two half sections are then aligned in face-to-face relationship to one another and a nonmagnetic spacer is placed between the confronting tips of the pole pieces. Finally, the two halves are joined by a second casting operation to form a unitary block. There are, however, a number of problems involved in this method of manufacturing a multi-channel head assembly. Since the heads are formed as half sections it is impossible to internally connect the windings of each head in series, which is done in many cases, and thus a large number of exposed lead wires are present which must be joined after the half sections are combined. Also, in such construction there is a possibility that the individual pole pieces are not exactly spaced and when the two halves are aligned the two pole pieces of an individual head may not be in exact alignment. This situation cannot be remedied since all the pole pieces are permanently set in the half sections and no adjustment can be made once the casting of the half section is completed. Due to the large number of individual pole tips and the fact that they are spread over a comparatively long section it has been found impossible to accurately machine the pole tips and as a result the finished head assembly often contains individual heads having gaps of different width from the other heads in the assembly. Besides conforming to predetermined dimensions the gap of all heads in a multiple head assembly should be the same. Since the gap spacing of a magnetic recording head is perhaps the most important structural feature of the head, as far as its ultimate operation is concerned, this problem of improper and inaccurate gap spacing is extremely critical in any multiple head assembly. Further, although the individual heads in this type of construction can be closely spaced thus resulting in a comparatively short unit assembly, the cross-sectional dimensions of the finished assembly must be comparatively large in order to provide sufficient supporting material about the half sections to prevent physical shocks from cracking the half sections apart. In the use of this type of head construction it is also impossible to replace an individual head which has failed and it is therefore necessary to replace the entire group of heads due to the failure of one single head. Finally, recording surfaces such as rotating disks or drums often have local discontinuities and it is impossible for the individual heads of a unitary block of head to follow such discontinuities. Thus, a small concave discontinuity will result in one or more of the heads being displaced from the recording surface in the immediate vicinity of the discontinuity and a small convex discontinuity will tend to raise all heads except those in the vicinity of the discontinuity away from the recording surface.

It is therefore an object of the present invention to provide an improved mold for forming an improved magnetic recording and reproducing head.

Another object of the present invention is to provide an improved pressure injection mold for forming a thin unitary body around a magnetic recording and reproducing head wherein the gap of said head may be accurately controlled.

Another object of the present invention is to provide an improved pressure injection mold containing novel pressure bars and aligning bars as well as a novel combination of mold depressions cooperating therewith.

Figure 6:
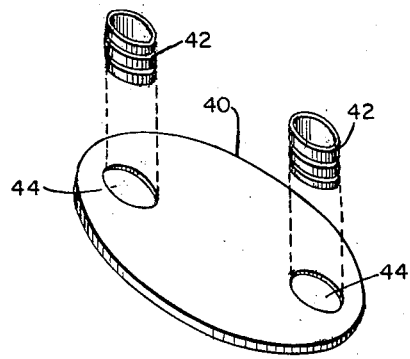
Figure 7:
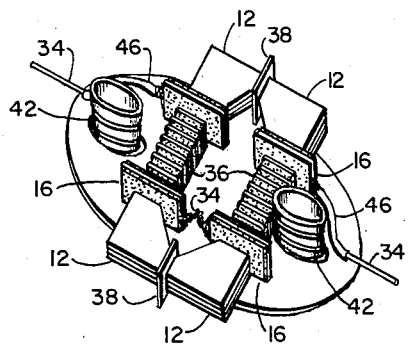
Figure 8:
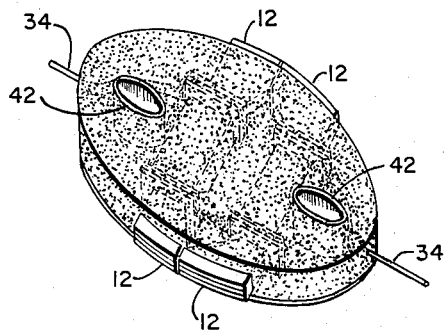
Figure 9:
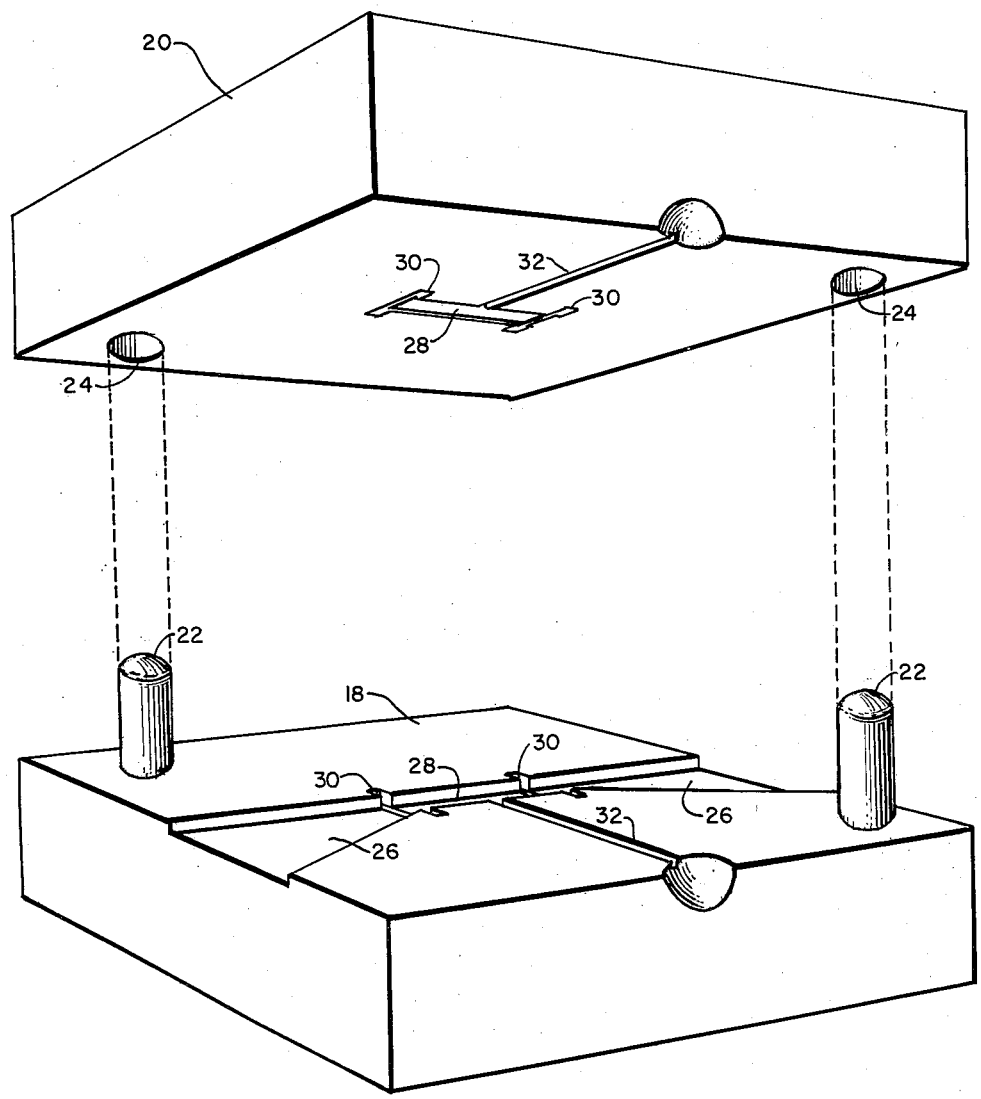

These and other objects and advantages of the present invention will be apparent from the following detailed description when read in conjunction with the accompanying drawings, wherein:

FIGURES 1 through 8, inclusive, illustrate the various component parts of a magnetic recording head around which the mold can place a thin unitary body, FIGURE 9 represents a mold suitable for forming a winding base, as shown in FIGURE 3, on each pole piece, FIGURE 10 represents a mold suitable for use in forming the finished recording head shown in FIGURE 8.

Figures 4, 5:
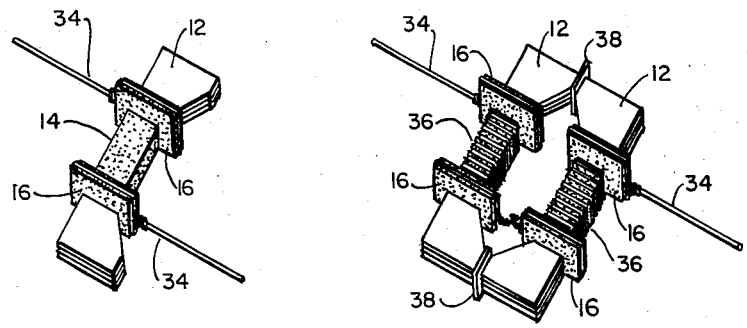

Referring now to FIGURES 1 through 10, inclusive, the numeral 10 designates a plurality of transformer steel laminations as shown in FIGURE 1. In addition to transformer steel, hydrogen annealed molybdenum permalloy, or other magnetic materials, may be employed. FIGURE 2 illustrates a pole piece 12 formed by cementing together a plurality of laminations 10. Generally, anywhere from two to eight or more laminations may be employed to produce the laminated pole piece, which in the instant case measures about 0.05 inch thick. FIGURE 3 shows a pole piece 12 having formed thereon a nonconductive winding base 14 having flanges 16 at either end thereof. Winding base 14 and flanges 16 are formed from a suitable nonconductive plastic or resinous material, such as nylon, polystyrene, epoxide-type resins, or the like, which is capable of being pressurre injection molded. In this instance, nylon has been found most suitable. It is to be observed that the complete winding base is formed in a single molding operation directly on the pole piece rather than in sections which must then be cemented on the pole piece. FIGURE 9 illustrates the mold employed to produce winding base 14 and flanges 16 on a pole piece. In accordance with FIGURE 9 the numeral 18 designates a base member of the mold while 20 represents a top member of the mold. The numeral 22 designates a pair of upstanding dowels fixedly attached to base member 18, which dowels cooperate with suitable holes 24 in top member 20. Obviously dowels 22 may be fixedly attached to top member 20 and be removable from base member 18 or be removable from both top member 20 and base member 18 since the function of the dowels is to align the top and bottom members. In forming the resinous winding base 14 and flanges 16 on pole piece 12, pole piece 12, whose longitudinal extremities cooperate with and rest in depressions 26 of base member 18, is placed in base member 18. When pole piece 12 is positioned in base member 18 it is to be observed that cooperating central depressions 28 of base member 18 and top member 20 are slightly larger than the dimensions of the central portion of pole piece 12. Thus a thin coating of resin will be formed about the central portion of pole piece 12 during the course of the molding operation to form winding base 14. Depressions 30 of base member 18 and top member 20 cooperate to form flanges 16 during the molding operation. With pole piece 12 in position on base 18 top member 20 is securely clamped to base member 18 by suitable clamp means (not shown) and molten resin, such as nylon, is injected through the aperture formed by channels 32 of base member 18 and top member 20. After winding base 14 and flanges 16 have been formed on pole piece 12 and the injection protrusion shown in FIGURE 3 has been removed suitable lead wires 34 are wound about flanges 16 as shown in FIGURE 4. In the next step of the operation suitable windings 36 are connected to lead wires 34 and wound about the winding base 14, for example, 600 turns of No. 43 wire. Two wound pole pieces are then placed in face-to-face relationship to one another, one pair of inner lead wires 34 are then connected together, and two thin, non-magnetic stainless steel spacers 38 are placed between the confronting tips of pole pieces 12 in order to provide a gap of uniform thickness between the pole pieces, all as shown in FIGURE 5. Spacers 38 are, of course, equal in thickness to the length of the gap desired, in this particular head being 0.0005 inch. Although only one of the gaps is used for recording or reproducing, the second gap provides magnetic symmetry in the structure and an increase in magnetic reluctance; in other words, the head is "hum-bucking" within certain limitations. Whenever the hum-bucking feature is not of major importance the second gap may be omitted by butt-joining one pair of confronting pole tips. In addition, although the windings are shown to be series connected and the present method of manufacture is most convenient for the production of a head having series connected windings the two windings may also be used either separately or in parallel. FIGURE 6 shows a shield 40 together with cooperating bushings 42 which fit within holes 44 of shield 40. Shield 40 is made of a suitable material of low magnetic permeability, such as mu-metal, and is employed to reduce cross-talk between the channels of a multi-channel unit. In the head being described shield 40 is 0.014 inch thick. Although it is most desirable to mold shields 40 into the head such shields may be merely placed between heads in assembling the multichannel unit. FIGURE 7 shows the assembled pole pieces of FIGURE 5 in position on shield 40. Also, as shown in FIGURE 7, the suitable insulation 46 may be placed around those portions of lead wires 34 which might come into contact with bushings 42.

In order to perform the second and last molding operation the component parts of the head are assembled, as illustrated in FIGURE 7, on the base member of the mold of FIGURE 10. The mold of FIGURE 10 is composed of a base member 48 and a top member 50. Upstanding dowels 52 are fixedly attached to base member 48 and cooperate with holes 54 of top member 50. The respective elements of the recording head are assembled in base member 48 of the mold as follows:

Shield 40 is placed in central depression 56 of base member 48. Bushings 42 are then positioned in holes 44 of shield 40. Inasmuch as the inner diameter of bushings 42 is equal to the diameter of holes 58 in central depression 56, bushings 42 will rest directly above holes 58. Pins 60, having a lower portion whose diameter is substantially equal to the inner diameter of bushings 42 and holes 58, are then placed in bushings 42 and holes 58. The upper ends of pins 60 are substantially equal in diameter to the outside diameter of bushings 42. The assembled pole pieces 12 are then placed in base member 48 with the longitudinal extremities of the pole pieces resting in depressions 62 of base member 48. The ends of lead wires 34 are placed in slots 68 of base member 48 and L-shaped aligning bars 64, slidably mounted in base member 48, are then clamped against the ends of pole pieces 12 by means of set screws 66 in order to position the pole pieces in the mold. Pressure bars 70, also slidably mounted in base member 48, are then forced against the back of one pole piece by means of pressure plate 72 and are clamped in this position by means of wing nut 74. Pressure bar 70 thus provides an adjustment which will cause pole pieces 12 to be pressed firmly against spacers 38. Top member 50 is then placed in position on base member 48 with holes 76 of top member 50 cooperatively engaging the protruding upper ends of dowels 60. With top member 50 in position set screws 78 in top member 50 are then tightened to clamp against pins 60. Finally, the top and base members of the assembled mold are clamped together by means of suitable clamps (not shown) and a molten resin, such as nylon, is injected into the mold through aperture 80 in top member 50. After the resin has set the molded recording head is then removed from the mold and the protruding ends of pole pieces 12 are machined to form arcuate contact surfaces. A finished recording and reproducing head is shown in FIGURE 8. As has been pointed out above, nylon is the preferred molding material for the formation of the head of the present invention. It has been found that nylon shrinks slightly during setting and thus additional pressure is applied to clamp spacers 38 between pole pieces 12 and thus aid in the adjustment of the gap length. The body of the finished head specifically described herein nominally measures 1 inch across, 1.5 inches in length, and 0.145 inch in thickness and the pole pieces protrude 0.03 inch on either side of the body. Since the thickness of the finished head is less than 3 times the thickness of the pole pieces it is to be observed that 20 of these heads, assembled as a multi-channel unit, would have a total length of only 2.9 inches, the total width of recording surface covered would be 2.805 inches and the "land" or distance between two tracks on the recording surface would be 0.095 inch. Obviously the recording heads of this invention may be made even smaller in thickness to further reduce the land width or the land width may be reduced by using two such multi-channel units whose tracks are interlaced.

It is to be observed that although specific embodiments of the instant invention have been illustrated and described herein, various modifications and substitutions may be made, which will be obvious to those skilled in the art, without departing from the scope of the present invention which is limited only by the appended claims.

Copending application Serial No. 40,033, filed June 30, 1960, covering a novel magnetic head; and copending application Serial No. 40,034, filed June 30, 1960, covering a novel magnetic head assembly are also divisional applications of the parent copending application, 563,463.

We claim:

1. A pressure injection mold adapted to form a thin unitary body around a single magnetic recording and reproducing head comprising
   (a) a top section and a bottom section cooperatively engageable with each other, said bottom section having an oblong, deep depression conforming to the desired shape of said body and a shallow depression extending laterally from each side of said depression and adapted to support the ends of a confronting pair of generally C-shaped pole pieces, said top section having a deep depression of the same shape as said deep depression in said bottom section and an aperture passing therethrough and adapted to permit the introduction of a fluid under high pressure into said deep depression of said top section, and
   (b) a pair of adjustable pressure bars slidably mounted in said bottom section and maintained separate from said deep depression, each of said pressure bars being adapted to slide into one of said shallow depressions in a direction parallel to the longitudinal axis of said deep depression and to supply equal pressure to the pole pieces in said shallow depression.

2. A pressure injection mold adapted to produce a thin unitary body around a single magnetic recording and reproducing head comprising
   (a) a top section and a bottom section cooperatively engageable with each other, said bottom section having an oblong, deep depression conforming to the desired shape of said body and a shallow depression extending laterally from each side of said deep depression and adapted to support the ends of a confronting pair of generally C-shaped pole pieces, said top section having a deep, single depression of the same shape as said deep depression in said bottom section, and one of said sections having an aperture passing therethrough and adapted to permit the introduction of a fluid into said deep depression of said section,
   (b) a pair of parallel adjustable pressure bars slidably mounted in said bottom section and maintained separate from said deep depression, each of said pressure bars being adapted to slide into one of said shallow depressions in a direction parallel to the longitudinal axis of said deep depression,
   (c) a single pressure plate adapted to apply pressure to said pair of adjustable pressure bars, and
   (d) at least one dowel adapted to engage said top and said bottom sections and to extend through said deep depressions in said top and bottom sections near one end of said deep depressions perpendicular to the plane of said top and bottom sections.

3. A pressure injection mold adapted to form a thin unitary body around a single magnetic recording and reproducing head comprising
   (a) a top section and a bottom section cooperatively engageable with each other, said bottom section having an oblong, deep depression conforming to the desired shape of said body and a shallow depression extending laterally from each side of said deep depression and adapted to support the ends of a confronting pair of generally C-shaped pole pieces, said top section having a deep, single depression of the same shape as said deep depression in said bottom section, and one of said sections having an aperture passing therethrough and adapted to permit the introduction of a fluid under high pressure into said deep depression of said section,
   (b) a pair of adjustable pressure bars slidably mounted in said bottom section and maintained separate from said deep depression, each of said pressure bars being adapted to slide into one of said shallow depressions in a direction parallel to the longitudinal axis of said deep depression, and
   (c) at least one adjustable aligning bar slidably mounted in said bottom section, said aligning bar being adapted to slide into one of said shallow depressions in a direction parallel to the transverse axis of said deep depression.

References Cited in the file of this patent

UNITED STATES PATENTS

| | | |
|---|---|---|
| 1,284,553 | Apple | Nov. 12, 1918 |
| 1,871,492 | Brennecke | Aug. 16, 1932 |
| 2,055,175 | Franz | Sept. 22, 1936 |
| 2,252,054 | Welch | Aug. 12, 1941 |
| 2,582,022 | Feldman et al. | Jan. 8, 1952 |
| 2,589,442 | Siegrist | Mar. 18, 1952 |
| 2,705,814 | Feldmann | Apr. 12, 1955 |
| 2,856,639 | Forrest et al. | Oct. 21, 1958 |
| 2,915,812 | Rettinger | Dec. 8, 1959 |
| 2,983,958 | Fay | May 16, 1961 |
| 2,991,511 | Kornei | July 11, 1961 |